C. A. LINDBERG.
STAPLE FASTENER.
APPLICATION FILED DEC. 1, 1916.

1,264,948.

Patented May 7, 1918.

Inventor
Charles A. Lindberg
By Moulton & Livrance
Attorneys.

UNITED STATES PATENT OFFICE.

CHARLES A. LINDBERG, OF STURGIS, MICHIGAN, ASSIGNOR OF ONE-THIRD TO JAMES F. JEWETT AND ONE-THIRD TO LLOYD R. HAWKINS, BOTH OF STURGIS, MICHIGAN.

STAPLE-FASTENER.

1,264,948.   Specification of Letters Patent.   Patented May 7, 1918.

Application filed December 1, 1916. Serial No. 134,372.

*To all whom it may concern:*

Be it known that I, CHARLES A. LINDBERG, a citizen of the United States of America, residing at Sturgis, in the county of St. Joseph and State of Michigan, have invented certain new and useful Improvements in Staple-Fasteners; and I do hereby declare the following to be a full, clear, and exact description of the invention, such as will enable others skilled in the art to which it appertains to make and use the same.

This invention relates to a fastener adapted for use in reed constructions of various characters, such as furniture, baby carriages and the like made largely from willow or reeds. Heretofore in connecting the ends of the reeds to a supporting frame therefor holes must be bored in the members of such frame and the ends of the reed inserted and glued in place, this requiring a considerable expenditure of labor and increasing the cost of manufacture. In my invention I provide a very simple, economical and easily manufactured connecting device for affording a permanent connection between the end of such reeds and the supporting frame work with which it is attached without the necessity of boring holes and gluing the parts together, and my invention has for its object and purpose the production of devices of this character capable of serving and attaining the ends specified. For an understanding of the same reference may be had to the accompanying drawing, in which;

Fig. 8 is a side elevation of a modified form of a connective device.

Like reference characters refer to like parts throughout the several views of the drawings.

Figure 1:
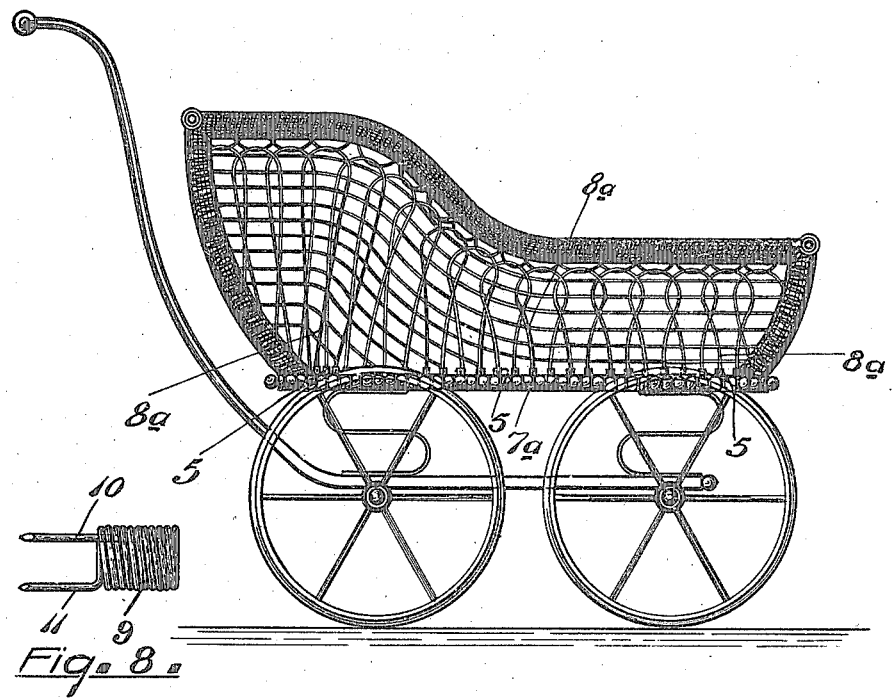
Figure 1 is a side elevation of a baby carriage in which my invention is used.
Figure 2:
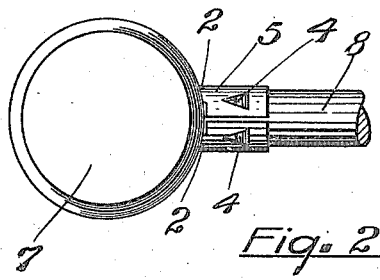
Fig. 2 is an elevation showing one form of connection and its use in the connecting end of a reed to a frame member.
Figure 5:
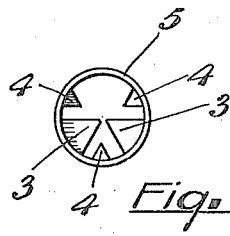
Figs. 5 and 6 are end elevations thereof from opposite ends.
Figure 6:
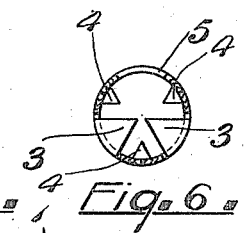
Figure 3:
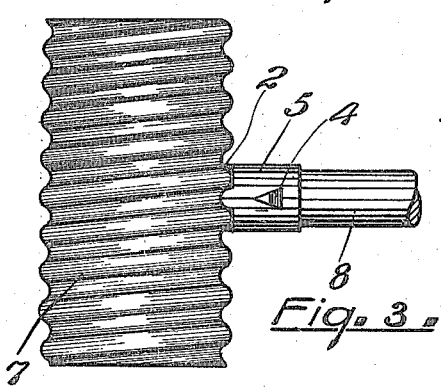
Fig. 3 is an under plan view of the construction shown in Fig. 2.
Figure 4:
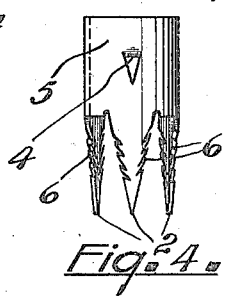
Fig. 4 is a side elevation of one form of connecting device.
Figure 7:
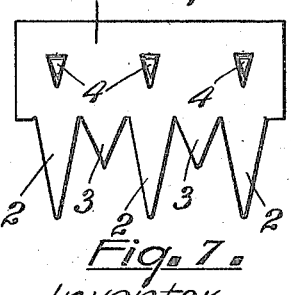
Fig. 7 is an elevation of the blank from which the connection is made.

Referring to Fig. 7 the blank 1 from which the connection is made is formed from thin sheet metal and has a plurality of spaced apart prongs 2 extending from one edge thereof between which are located shorter projections 3. In the body of the blank a number of pointed tangs 4 are cut. This blank is rolled into substantially cylindrical form as shown at 5 providing an open end at one end while the opposite end is partially closed by turning the projections 3 inwardly as best shown in Fig. 6. The prongs 2, preferably, are notched at their edges so that when inserted in any suitable support, such as 7, a greater resistance is offered to withdrawal than if such prongs had smooth edges. The connection is driven into the support until stopped by the inturned members 3 and the reed such as indicated at 8 is inserted at the open end of the device until stopped by said parts 3. Tangs 4 are then pressed inwardly to engage with and hold the reed against displacement. This connecting device may be used with various articles of furniture and I have shown an illustration of its use in Fig. 1, a plurality of devices 5 being located along the bottom 7ª of the carriage body while the ends of reed 8ª are inserted into said connecting devices and are permanently secured thereto in the manner described. Many other uses of the invention in other articles will suggest themselves.

A modified form of connecting device is shown in Fig. 8 as formed from a continuous piece of wire wound into a coil 9 one end of the coil being bent back and extended through the coil and a distance beyond, terminating in an attaching prong 10, while the opposite end of the coil is turned across the adjacent open end of the coil and then formed into an attaching prong 11 substantially parallel to the prong 10. This attaching device can be driven into any suitable support and when a reed is forced into the coil 9 its engagement by the wire 10 on the inside of the coil has tendency to hold it against displacement. And if desired this wire 10 may be formed with retaining notches and projections similar to those indicated at 6 on the prongs 2.

What I claim is:—

1. A fastener comprised of a body having an open end, prongs projecting from said body at the opposite end thereof, said body being adapted to receive the end of a reed or the like at said open end thereof, and stop means at the opposite end of the body formed integral therewith to prevent passage of a reed or the like through said body.

2. A fastener formed from a blank of sheet metal bent into cylindrical form having an open end, attaching prongs projecting from the opposite end of the cylinder, members turned inwardly between the prongs partially closing said opposite end, and tangs struck inwardly from the cylinder, substantially as described.

3. A fastener including a cylindrical body and having an open end, attaching prongs projecting from the opposite end of the body, and members turned inwardly between the prongs partially closing the end of the body opposite to said open end.

4. A fastener comprised of a cylindrical body having one end open for the insertion of the end of a reed or the like, a member integral with and partially closing the opposite end of said body to prevent passage of the reed therethrough, and attaching prongs projecting from said last mentioned end of the body in a direction substantially parallel to the axis of said body.

In testimony whereof I affix my signature.

CHARLES A. LINDBERG.

Copies of this patent may be obtained for five cents each, by addressing the "Commissioner of Patents, Washington, D. C."